Patented Sept. 11, 1951

2,567,358

UNITED STATES PATENT OFFICE 2,567,358

COCCIDIOSIS CONTROL COMPOSITION

Emanuel Waletzky, Stamford, Conn., assignor to American Cyanamid Company, New York, N. Y., a corporation of Maine No Drawing. Application September 5, 1947, Serial No. 772,474

6 Claims. (Cl. 167—53.1)

This invention relates to coccidiosis and to means and methods for the prevention and control thereof.

Coccidiosis is an economically important disease of the animal kingdom. Although it is especially prevalent and destructive in chickens and turkeys, it is also found in lambs, calves and other domesticated animals. The losses in the poultry industry are especially high, as most flocks are subjected to the disease in one form or another during their life cycle.

The causative organism of coccidiosis is a protozoa which is introduced into the intestinal tract through oocysts. Sporozoites are released and invade the intestinal lining. The principal genus of the protozoa causing coccidiosis in domesticated animals is the Eimeria of which there are various species which cause different types of infection having various degrees of mortality.

Numerous drugs have been suggested for the treatment of coccidiosis, but most of these have various shortcomings including excessive toxicity, high cost, difficulty in administration, large dosage and other disadvantages. Most of these drugs are effective only to control or prevent the disease.

Although the dithiocarbamates are known compounds and have been described as having fungicidal and bactericidal properties, I am unaware of the previous use of drugs of this class in the control of coccidiosis. This is not surprising in that, as will be shown hereinafter, only a very few specific dithiocarbamates possess appreciable activity against the causative organism of coccidiosis. The specific dithiocarbamates which I have found to be extremely effective against protozoa diseases including coccidiosis are those having the formula

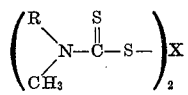

in which R is a methyl or ethyl radical and X is nickel or copper. These nickelous or cupric salts of the lower dialkyl dithiocarbamates have been found to be exceptionally effective in controlling the incidence of coccidiosis in domesticated animals. Strangely, other closely related salts are not effective or relatively ineffective for the same purpose. To illustrate this fact the following table shows some of the results obtained upon testing a large number of dithiocarbamates in experimentally induced coccidiosis in the chick with the *Eimeria tenella* species. For convenience, the most effective dithiocarbamates of the series are listed as having an activity of unity.

| Name | Activity |
|---|---|
| Cupric methyl ethyl dithiocarbamate | 0.75 |
| Cupric dimethyl dithiocarbamate | 1.0 |
| Nickelous dimethyl dithiocarbamate | 1.0 |
| Ferric dimethyl dithiocarbamate | 0.1 |
| Ferrous dimethyl dithiocarbamate | 0.1 |
| Cadmium dimethyl dithiocarbamate | 0.1 |
| Manganous dimethyl dithiocarbamate | 0.1 |
| Stannous dimethyl dithiocarbamate | 0.1 |
| Zinc dimethyl dithiocarbamate | 0.1 |
| Cobaltous dimethyl dithiocarbamate | Inactive |
| Lead dimethyl dithiocarbamate | Toxic |
| Cupric diethyl dithiocarbamate | 0.1 |
| Cupric methyl dithiocarbamate | Inactive |
| Cupric ethyl dithiocarbamate | Inactive |
| Cupric n-butyl dithiocarbamate | Inactive |
| Cupric dithiocarbamate | Inactive |

Numerous other dithiocarbamates have been tested under the same conditions and found to possess little or no activity in the control of coccidial infection.

One of the most important advantages of the cupric and nickelous salts of the present invention is their activity at extremely low concentrations of the drug. These compounds are effective when mixed with ordinary rations at concentrations of about 0.005 to 0.2%. At these concentrations coccidial lesions are not completely prevented. This is an important advantage in that the light infections which are allowed to occur result in the development of an acquired immunity in the animal which lasts its lifetime. It is necessary, therefore, that the treatment be continued only during the early stages of the animal's life.

Because of the very small amount of the drug incorporated in the feed, there is no difficulty in securing an adequate dosage of the drug in the animal through normal feeding operations. The relatively low dosage and toxicity of the compounds also minimizes the development of toxic effects in the animal by overdosage.

It is pointed out that like most other treatments of coccidiosis now available our new treatment is not a cure for coccidiosis when the disease has once been established in the animal. Although it has not been possible to demonstrate as a fact up to the present time, it is believed that the drug attacks the sporozoites which are released from the oocysts in the intestinal tract of the animal before the sporozoites invade the intestinal lining.

The preferred manner of administering the dithiocarbamates of the present invention is to thoroughly mix the drug in the animal's feed in the proportions indicated above. Higher concentrations of the drug may be mixed with selected portions of the animal's daily rations as, for example, in the mash, the concentration being so regulated that the animal will ingest approximately 10 to 100 mgs. of the drug per kilogram of body weight per day. Other means of administration are not precluded. In some cases it may be desirable to administer the drug to the animal in one or more daily doses in capsules or pellets or as a drench. The drugs are insoluble in water, and administration thereof in the drinking water does not appear to be practical.

The cupric and nickelous salts of the dithiocarbamates of the present invention are also active against other protozoa parasites such as *Endamoeba histolytica* and other protozoa which need not be mentioned here.

I claim:

1. A poultry feed for the control of coccidiosis comprising edible poultry food and from about 0.005 to 0.02% by weight of a compound having the formula

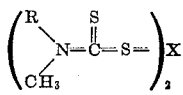

in which R is a member of the group consisting of methyl and ethyl radicals and X is a member of the group consisting of nickel and copper.

2. A poultry feed for the control of coccidiosis comprising edible poultry food and from about 0.005 to 0.02% by weight of cupric methyl ethyl dithiocarbamate.

3. A poultry feed for the control of coccidiosis comprising edible poultry food and from about 0.005 to 0.02% by weight of cupric dimethyl dithiocarbamate.

4. A poultry feed for the control of coccidiosis comprising edible poultry food and from about 0.005 to 0.02% by weight of nickelous dimethyl dithiocarbamate.

5. A composition effective in the control of coccidiosis comprising having the formula

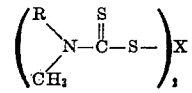

in which R is a member of the group consisting of methyl and ethyl radicals and X is a member of the group consisting of nickel and copper, and a poultry food as carrier therefor.

6. A composition for the control of coccidiosis in poultry comprising chicken feed which contains cupric dimethyl dithiocarbamate.

EMANUEL WALETZKY.

REFERENCES CITED

The following references are of record in the file of this patent:

UNITED STATES PATENTS

| Number | Name | Date |
|---|---|---|
| 1,972,961 | Tisdale | Sept. 11, 1934 |
| 2,279,421 | Tisdale | Apr. 14, 1942 |

OTHER REFERENCES

Herrick et al., American Journal of Veterinary Research, vol. 3 (January 1942), pgs. 117 to 127.

Malatesta, Chemical Abstracts, vol. 36, page 983. (Copy in Scientific Library.)